United States Patent
Kim et al.

(10) Patent No.: US 8,165,717 B2
(45) Date of Patent: Apr. 24, 2012

(54) METHOD, MEDIUM, AND APPARATUS FOR CORRECTING POSE OF MOVING ROBOT

(75) Inventors: Dong-jo Kim, Yongin-si (KR);
Hyong-ki Lee, Seongnam-si (KR);
Dong-ryeol Park, Hwaseong-si (KR);
Seok-won Bang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1008 days.

(21) Appl. No.: 12/153,600

(22) Filed: May 21, 2008

(65) Prior Publication Data

US 2009/0149994 A1     Jun. 11, 2009

(30) Foreign Application Priority Data

Dec. 11, 2007     (KR) ................. 10-2007-0128264

(51) Int. Cl.
*B25J 5/00*     (2006.01)
*G05B 13/00*     (2006.01)
(52) U.S. Cl. .............. 700/259; 700/61; 700/258; 901/1; 901/50
(58) Field of Classification Search .................. 700/258; 901/46
See application file for complete search history.

(56) References Cited

U.S. PATENT DOCUMENTS

| | | | |
|---|---|---|---|
| 6,732,826 B2 | 5/2004 | Song et al. | |
| 7,539,557 B2 * | 5/2009 | Yamauchi | 700/245 |
| 2002/0153184 A1 | 10/2002 | Song et al. | |
| 2007/0118248 A1 * | 5/2007 | Lee et al. | 700/245 |
| 2008/0119961 A1 * | 5/2008 | Myeong et al. | 700/262 |
| 2008/0273791 A1 * | 11/2008 | Lee et al. | 382/153 |
| 2009/0024251 A1 * | 1/2009 | Myeong et al. | 700/259 |

FOREIGN PATENT DOCUMENTS

| | | |
|---|---|---|
| JP | 2002-325708 | 11/2002 |
| KR | 10-2004-0039093 | 5/2004 |
| KR | 10-2004-0086940 | 10/2004 |
| KR | 10-2005-0011054 | 1/2005 |

OTHER PUBLICATIONS

Althaus, P and Christensen, H.I. "Automatic Map Acquisition for Navigation in Domestic Environments", retrievied from gatech.edu/~hic/hic~papers/icra03.*

* cited by examiner

*Primary Examiner* — Thomas Black
*Assistant Examiner* — Lin B Olsen
(74) *Attorney, Agent, or Firm* — Staas & Halsey LLP

(57) ABSTRACT

A method, apparatus, and medium for correcting a pose of a moving robot are provided. The method includes sensing an entrance using a distance-sensing sensor mounted on the moving robot, storing first distance data of the sensed entrance, after the moving robot travels, newly sensing the entrance using the distance-sensing sensor, and correcting the pose of the moving robot using the first distance data and second distance data corresponding to the entrance newly sensed after the moving robot travels.

14 Claims, 11 Drawing Sheets

600

METHOD, MEDIUM, AND APPARATUS FOR CORRECTING POSE OF MOVING ROBOT

CROSS-REFERENCE TO RELATED APPLICATIONS

This application claims priority benefit from Korean Patent Application No. 10-2007-0128264 filed on Dec. 11, 2007, in the Korean Intellectual Property Office, the disclosure of which is incorporated herein by reference in its entirety.

BACKGROUND

1. Field

The present invention relates to a method, medium, and apparatus for correcting a pose of a moving robot, and, more particularly, to a method, medium, and apparatus for correcting pose errors of a moving robot that are caused due to a slip or accumulation of errors in the sensor signal while the moving robot travels.

2. Description of the Related Art

Recently, in addition to industrial robots used in industrial sites, robots have been commercialized for use as housework or office work assistants in homes and offices. Leading examples of those robots include cleaning robots, guide robots and security robots.

Generally, the moving robot travels in a given space and performs its tasks. In order to enable a robot to travel and perform its tasks in a given environment, information for building a map of surroundings and information about the position and heading angle of the robot are necessary. In order to build the map and to make the robot recognize the information about the surroundings, the position and the heading angle of the robot, a simultaneous localization and mapping (SLAM) algorithm is one of the most widely used methods.

The SLAM algorithm is used to build a surrounding map at a certain position and, based on the built map, to keep track of a new position of the robot that has traveled, thereby achieving simultaneous localization and surrounding map building.

However, when a moving robot performs SLAM, errors in the position and heading angle of the moving robot may be generated due to a slip of the moving robot or accumulation of errors caused by errors of a traveling sensor such as an encoder. Thus, when the map is completed, the overall structure of the map may become different from the actual map.

Accordingly, it is necessary to prevent performance of the moving robot from deteriorating due to the accumulation of errors by correcting the errors in the position and heading angle of the moving robot.

SUMMARY

An aspect of the present invention provides a method, medium, and apparatus for preventing accumulation of pose errors of a moving robot by correcting a pose using distance data detected when the moving robot enters an entrance and distance data detected when the moving robot comes out from the entrance.

According to an aspect of the present invention, there is provided a method and apparatus for correcting a pose of a moving robot. The method includes sensing an entrance using a distance-sensing sensor mounted on the moving robot, storing first distance data of the sensed entrance, after the moving robot travels, newly sensing the entrance using the distance-sensing sensor, and correcting the pose of the moving robot using the first distance data and second distance data corresponding to the entrance newly sensed after the moving robot travels.

According to another aspect of the present invention, there is provided an apparatus for correcting the pose of a moving robot, including: a distance-data-obtaining unit to obtain distance data using a distance-sensing sensor mounted on a moving robot; a storage unit to store distance data of the sensed entrance; a pose-correction unit to compare the stored distance data of the sensed entrance and to correct the pose of the moving robot, wherein the pose-correction unit corrects the pose of the moving robot using first distance data corresponding to an entrance that is first sensed and stored and second distance data corresponding to the newly sensed entrance after the moving robot travels.

BRIEF DESCRIPTION OF THE DRAWINGS

These and/or other aspects, features, and advantages will become apparent and more readily appreciated from the following description of embodiments, taken in conjunction with the accompanying drawings of which.

DETAILED DESCRIPTION OF EMBODIMENTS

Figure 1:
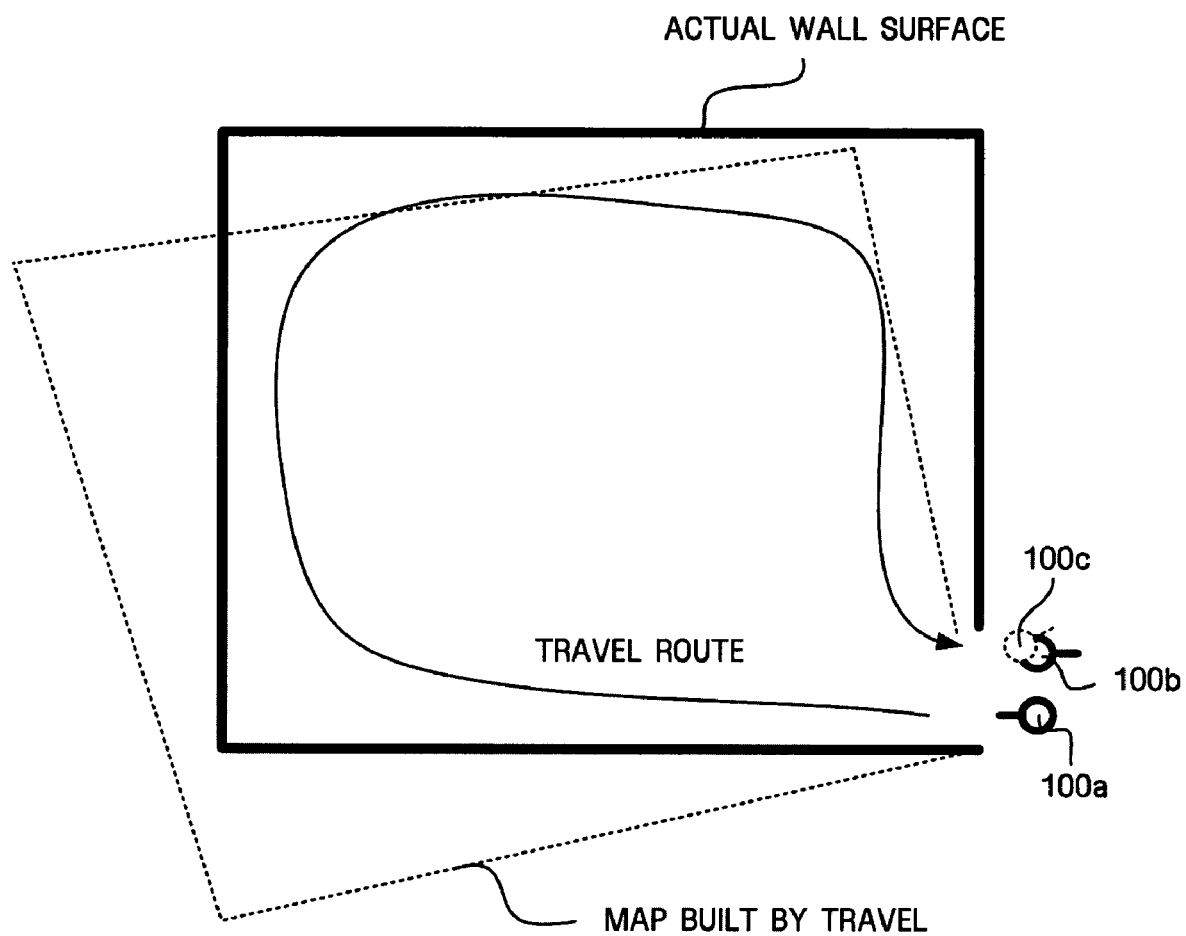
FIG. 1 illustrates a pose error generated when a moving robot enters an area through an entrance and travels within the area and when the moving robot comes out from the area through the same entrance.

Reference will now be made in detail to embodiments, examples of which are illustrated in the accompanying drawings, wherein like reference numerals refer to the like elements throughout. Embodiments are described below to explain the present invention by referring to the figures.

Embodiments of the present invention are described hereinafter with reference to flowchart illustrations of a method and apparatus for correcting a pose of a moving robot according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to implement the functions specified in the flowchart block or blocks.

These computer program instructions may also be stored in a computer usable or computer-readable memory that can direct a computer or other programmable data processing apparatus to function in a particular manner, such that the instructions implement the function specified in the flowchart block or blocks.

The computer program instructions may also be loaded into a computer or other programmable data processing apparatus to cause a series of operational steps to be performed in the computer or other programmable apparatus to produce a computer implemented process for implementing the functions specified in the flowchart block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

The entire area in which the robot performs its intrinsic task (e.g., a cleaning task in the case of a cleaning robot), including map building, while traveling in the area, is generally decomposed into several compartments based on an entrance. For example, in an ordinary home environment, the area, including a living room, rooms, kitchen, and so on, may be decomposed by an entrance (door). That is, the moving robot may enter a room through the room's entrance to perform a cleaning task while traveling, come back from the room through the entrance, enter another room through the other room's entrance to then perform its task, and come back from the other room through the same entrance. This procedure may be repeatedly performed for the decomposed compartments of the entire area.

In this case, there may be a pose error of the moving robot when the moving robot enters a particular compartment (e.g., a room) through an entrance and after the moving robot comes back from the room through the entrance. As described above, the pose error may be caused due to slip of the moving robot or accumulation of errors by a traveling sensor.

In particular, when the slip of the moving robot occurs while the moving robot travels along parts of the ceiling where there are no feature points, the position of the moving robot is inaccurately corrected, thereby resulting in an increase in the pose error of the moving robot. The term "pose" used herein denotes two-dimensional (2-D) coordinates along a plane of the moving robot, such as the position and heading angle. In addition, when the moving robot travels along a bottom area, such as a bed or a table, the moving robot travels using dead-reckoning data only, so that pose correction using feature points cannot be performed, eventually increasing the pose error of the moving robot.

As described above, as the pose errors of the moving robot continue to accumulate, the position of the moving robot as determined by the moving robot itself becomes quite different from the actual position of the moving robot, and the map built by the moving robot may be inaccurate.

Figure 2:
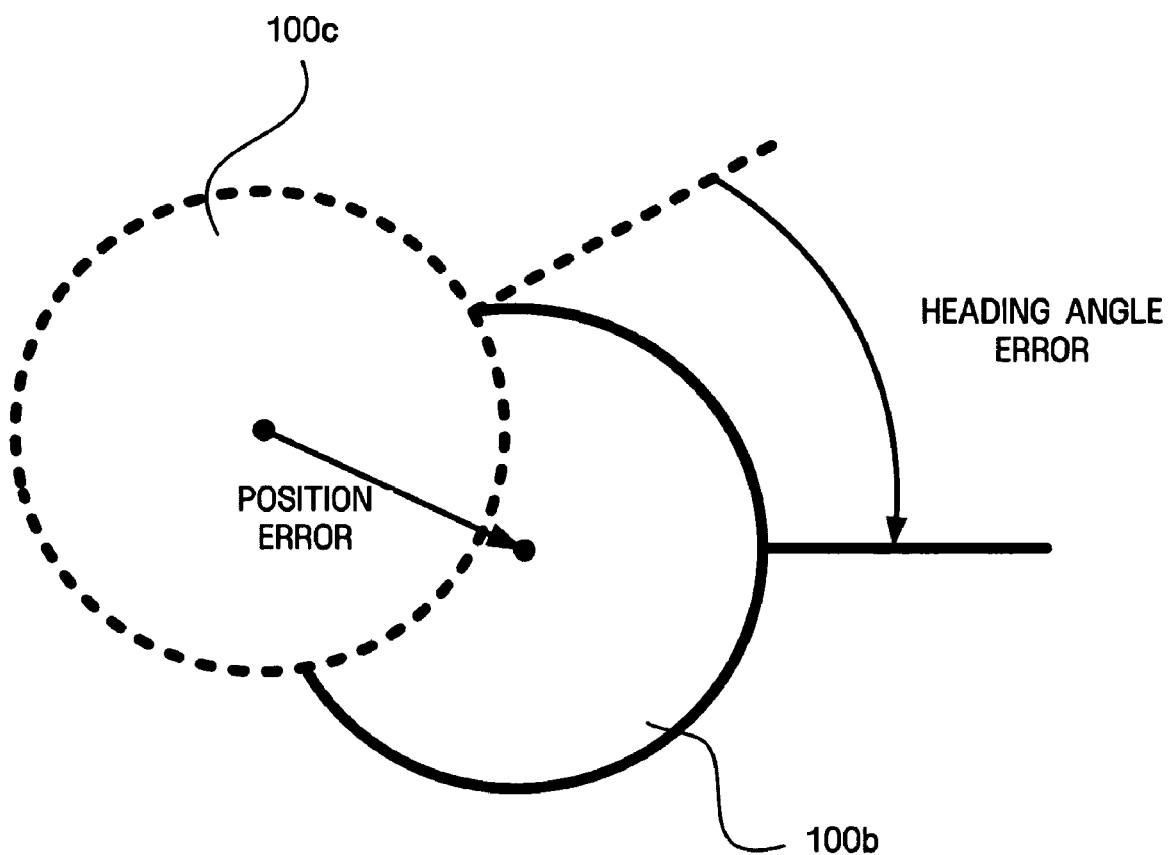
FIG. 2 is an enlarged view of 100b and 100c shown in FIG. 1, illustrating the position error and heading angle error to be corrected.

FIG. 1 illustrates a pose error generated when a moving robot enters an area through an entrance and travels within the area and when the moving robot comes out from the area through the same entrance, and FIG. 2 is an enlarged view of 100*b* and 100*c* shown in FIG. 1, illustrating the position error and heading angle error to be corrected.

In FIG. 1, a thick solid line indicates an actual wall surface. The moving robot with a pose labeled 100*a* enters a room through an entrance, travels in the room, and then comes out back from the room through the entrance. In FIG. 1, a dotted line indicates a map built by the moving robot while traveling. As described above, a difference is created between the map built by the moving robot and the actual wall surface. Therefore, when the moving robot comes back through the entrance, the actual pose of the moving robot is 100*b*, while based on the inaccurately built map, the pose determined by the moving robot is 100*c*. Accordingly, in order to prevent pose errors of the moving robot from accumulating, it is necessary to correct the pose of the moving robot when the moving robot comes back through the entrance, prior to traveling to another room.

FIG. 2 illustrates the actual pose 100*b* of the moving robot and the pose 100*c* determined by the moving robot, in which errors in the position and heading angle should be corrected.

Figure 3:
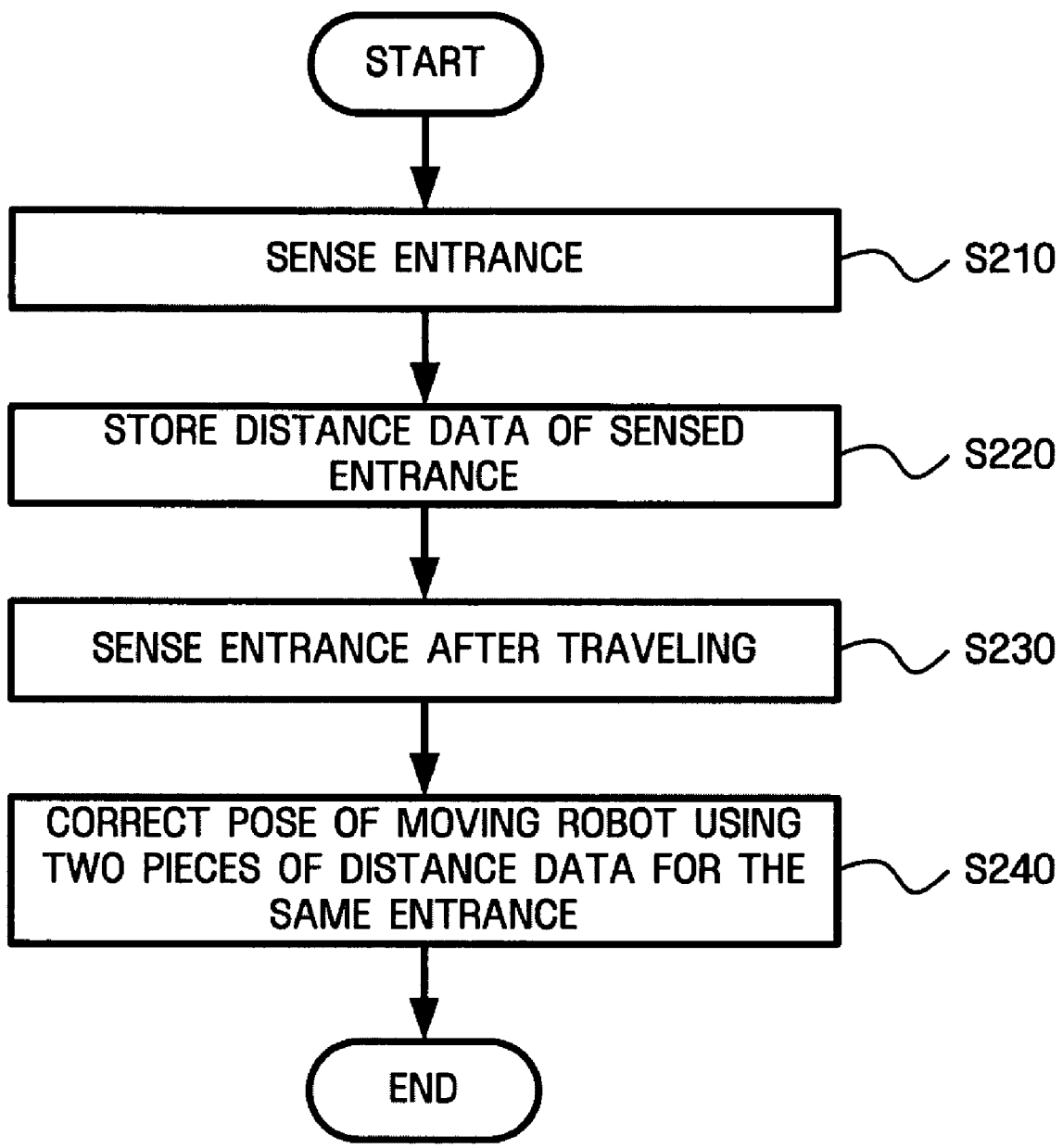
FIG. 3 is a flowchart illustrating a method for correcting a pose of a moving robot according to an embodiment of the present invention.

FIG. 3 is a flowchart illustrating a method for correcting a pose of a moving robot according to an embodiment of the present invention;

First, the moving robot performs SLAM using the information about a distance from an obstacle, such as inside walls, at a current position of the moving robot obtained using a distance-sensing sensor, e.g., a structured light sensor or an infrared ray sensor.

The structured light sensor illuminates light to an obstacle using an active vision system like a laser, and information about an image reflected from the obstacle is acquired using a camera sensor. Here, the camera sensor is positioned over the active vision system to obtain the image information while maintaining a predetermined distance from the active vision system. Here, a near-infrared (NIR) line laser beam is used as a light source. That is, the data about the distance from the obstacle can be obtained by horizontally illuminating the obstacle within a constant range of viewing angle. In addition, use of a laser beam allows the distance data to be obtained even from a dark area without being illuminated.

Here, since the camera sensor obtains line-profile image information and the Y-axis values of the obtained image are proportionate to the distance between the camera sensor and the obstacle, the distance can be obtained. Distance data between the light source and the obstacle can be obtained by a triangular method using the distance between camera sensor and the obstacle obtained from the coordinates of camera image information, the angle of the camera sensor with respect to the obstacle, and the distance between the camera sensor and the light source.

Hereinafter, an embodiment of a procedure of implementing the present invention by obtaining the information about the distance from the obstacle using the structured light sensor will be described.

A moving robot obtains distance data from an obstacle using a distance-sensing sensor while traveling to then repeatedly perform, based on the distance data, current pose updating and map updating using a SLAM (Simultaneous Localization And Map building) algorithm, and an entrance is sensed based on the obtained distance data (S210).

A method for sensing an entrance will now be described with reference to FIGS. 4 through 6.

Figure 4:
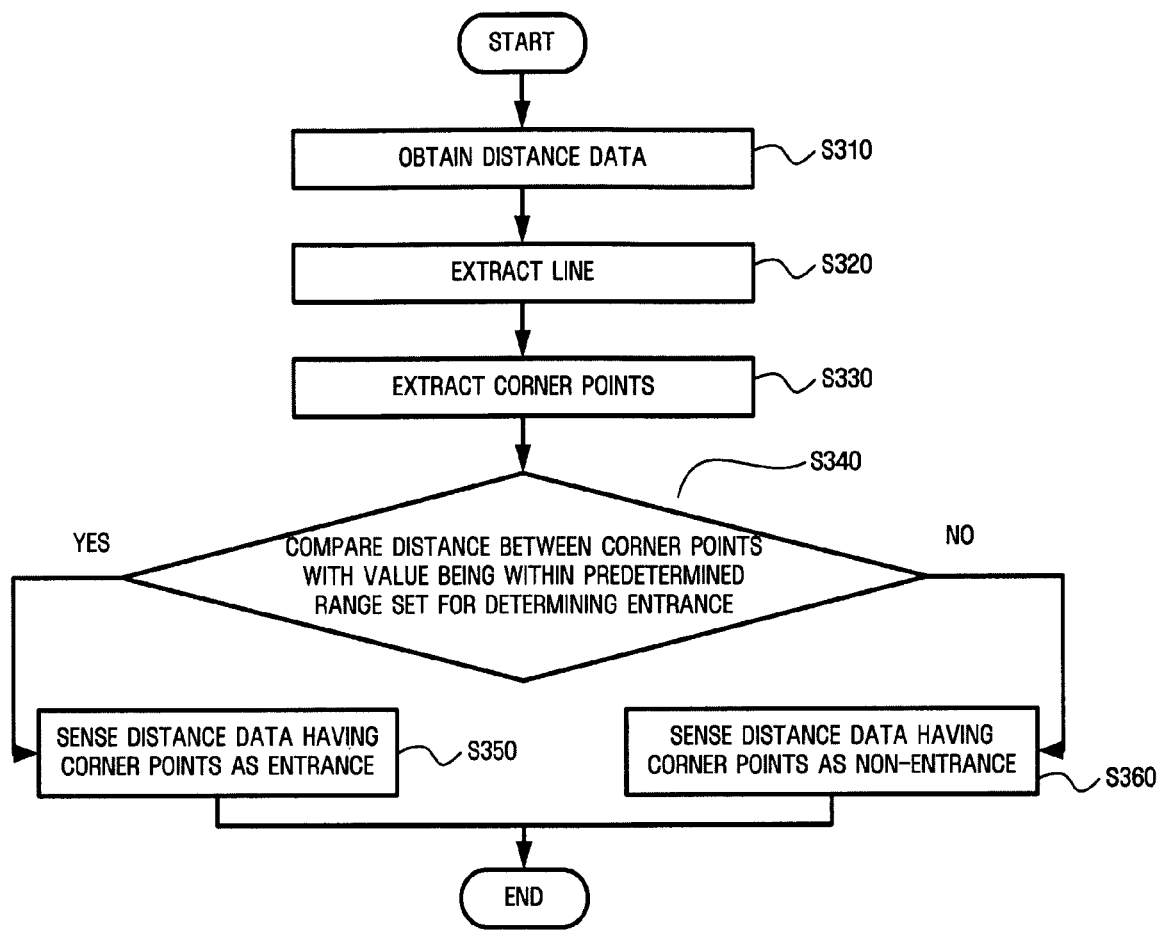
FIG. 4 is a flowchart illustrating a method of sensing an entrance using a distance-sensing sensor according to an embodiment of the present invention.
Figure 5:
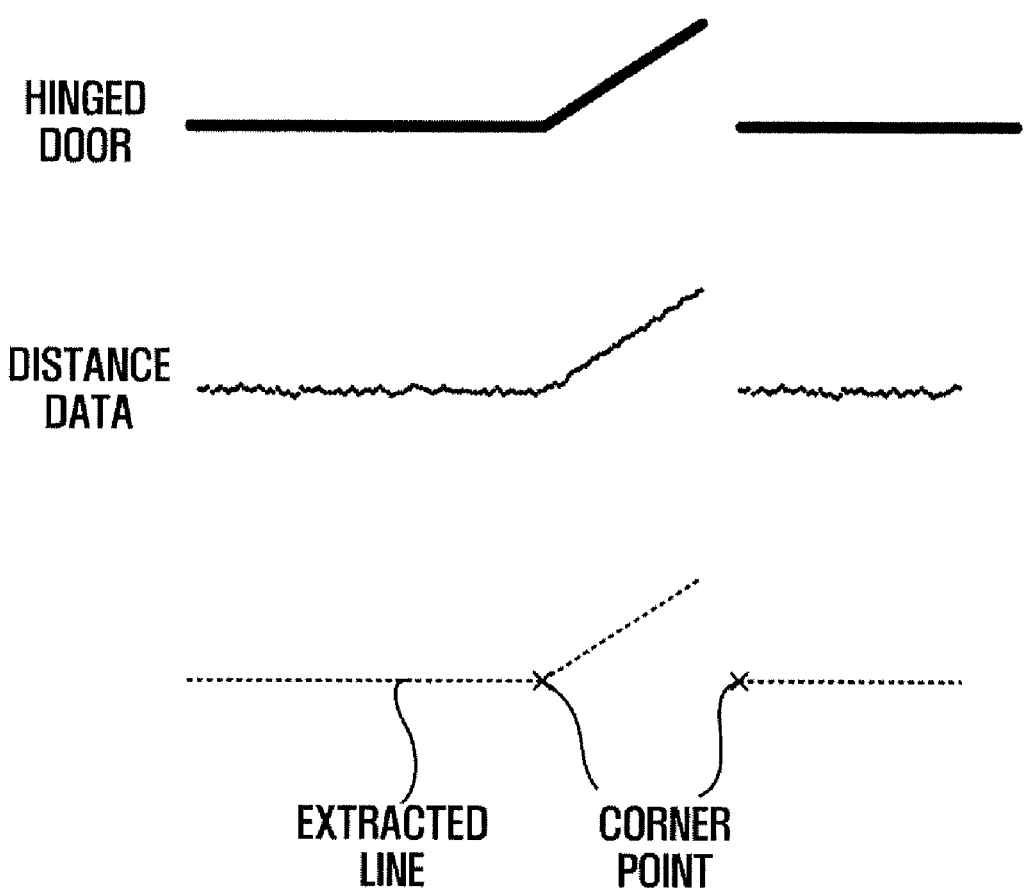
FIG. 5 illustrates that corner points are extracted from distance data for a hinged door using the flowchart shown in FIG. 4.
Figure 6:
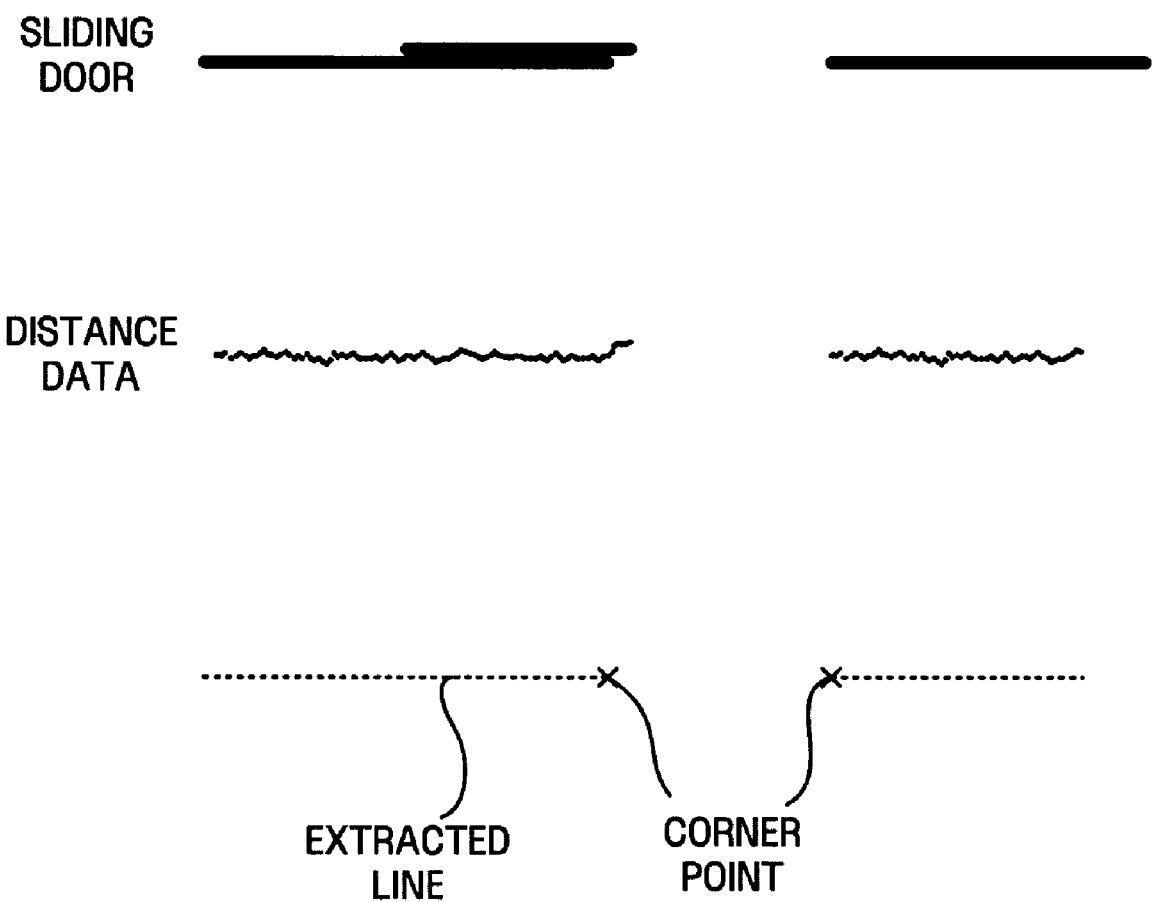
FIG. 6 illustrates that corner points are extracted from distance data for a sliding door using the flowchart shown in FIG. 4.

FIG. 4 is a flowchart illustrating a method for sensing an entrance using a distance-sensing sensor according to an embodiment of the present invention, FIG. 5 illustrates that corner points are extracted from distance data for a hinged door using the flowchart shown in FIG. 4, and FIG. 6 illustrates that corner points are extracted from distance data for a sliding door using the flowchart shown in FIG. 4.

First, distance data is obtained using a distance-sensing sensor (S310). FIGS. 5 and 6 illustrate that distance data is commonly obtained from entrances installed on a hinged door and a sliding door, respectively.

Next, a line is extracted from the obtained distance data (S320). A Hough Transform algorithm may be used to detect the line from the distance data. The Hough Transform technique is used to transform 2D image data points including noise components into a Hough Space or a parameter space to detect a particular value represented as an extreme value in the parameter space, thereby obtaining a straight line or contour line using equation (1):

$$x \cos \delta + y \sin \delta = r \qquad (1)$$

where r indicates the perpendicular distance from the origin to the line, and δ indicates the angle of the line.

After extracting the line from the distance data, opposing corner points of the entrance are extracted (S330). In the case of a hinged door, the corner points are positioned at the rotation center of the door. The corner points can be extracted by obtaining the intersection of a line forming wall surfaces and a line forming the door. In FIG. 5, from the viewpoint of the door, the left tip of the right-hand line is extracted as a corner point of the entrance. Because the right tip is obtained by the range of structured light illumination.

The Harris corner detector algorithm, which is well known in the art, may also be used to extract the corner point.

Next, the distance between the obtained opposing corner points is obtained and the obtained distance is compared with a value being within a general range, the value set for sensing an entrance (S340). If the distance is within the general range, the distance data having the opposing corner points obtained there from is considered an entrance (S350). If the distance is out of the general range of the set value, the distance data having the opposing corner points obtained therefrom is not considered an entrance (S360).

For example, assuming that a hinged door width for a home is generally 1 meter (m), the determination value is set to be in the range of 0.9-1.1 m. If the distance between corner points is within this range, the distance data having the corner points obtained therefrom is sensed as an entrance. If the distance between corner points is not within this range, the distance data having the corner points obtained therefrom is sensed as a non-entrance.

Referring back to FIG. 3, after sensing the entrance from the distance data, the distance data of the entrance is stored (S220). Here, the storing of the distance data may denote storing data of distance values obtained by the distance-sensing sensor or storing distance data images captured by a camera, as shown in FIGS. 5 and 6.

After sensing the entrance, the moving robot either enters another compartment through the sensed entrance or repeatedly performs SLAM procedures while traveling within an area of its current position.

During these procedures, the moving robot senses the same entrance again using the distance-sensing sensor (S230). A method of sensing the entrance is the same as described above and a detailed explanation will not be given.

Assuming that the distance data for the entrance that is sensed first and stored is referred to as first distance data, and the distance data for the entrance that is sensed newly is referred to as second distance data, the pose of the moving robot is corrected using the two pieces of distance data (S240).

As described above with reference to FIGS. 1 and 2, until obtaining the second distance data after obtaining the first distance data, an actual pose of the moving robot is different from a pose determined by the moving robot due to slip or accumulation of errors while traveling. In this case, the two sets of distance data are used in correcting the pose of the moving robot when the second distance data is obtained.

In the pose-correcting method according to an embodiment of the present invention, for the same entrance, first distance data and second distance data are obtained and compared with each other to correct the pose of the moving robot. Typically, multiple entrances exist in the entire area in which the moving robot travels. Therefore, it is necessary to determine whether the entrance of the first distance data and the entrance of the second distance data are obtained from the same entrance. Hereinafter, a method for determining whether the entrance of the first distance data and the entrance of the second distance data are obtained from the same will be described with reference to FIG. 7.

Figure 7:
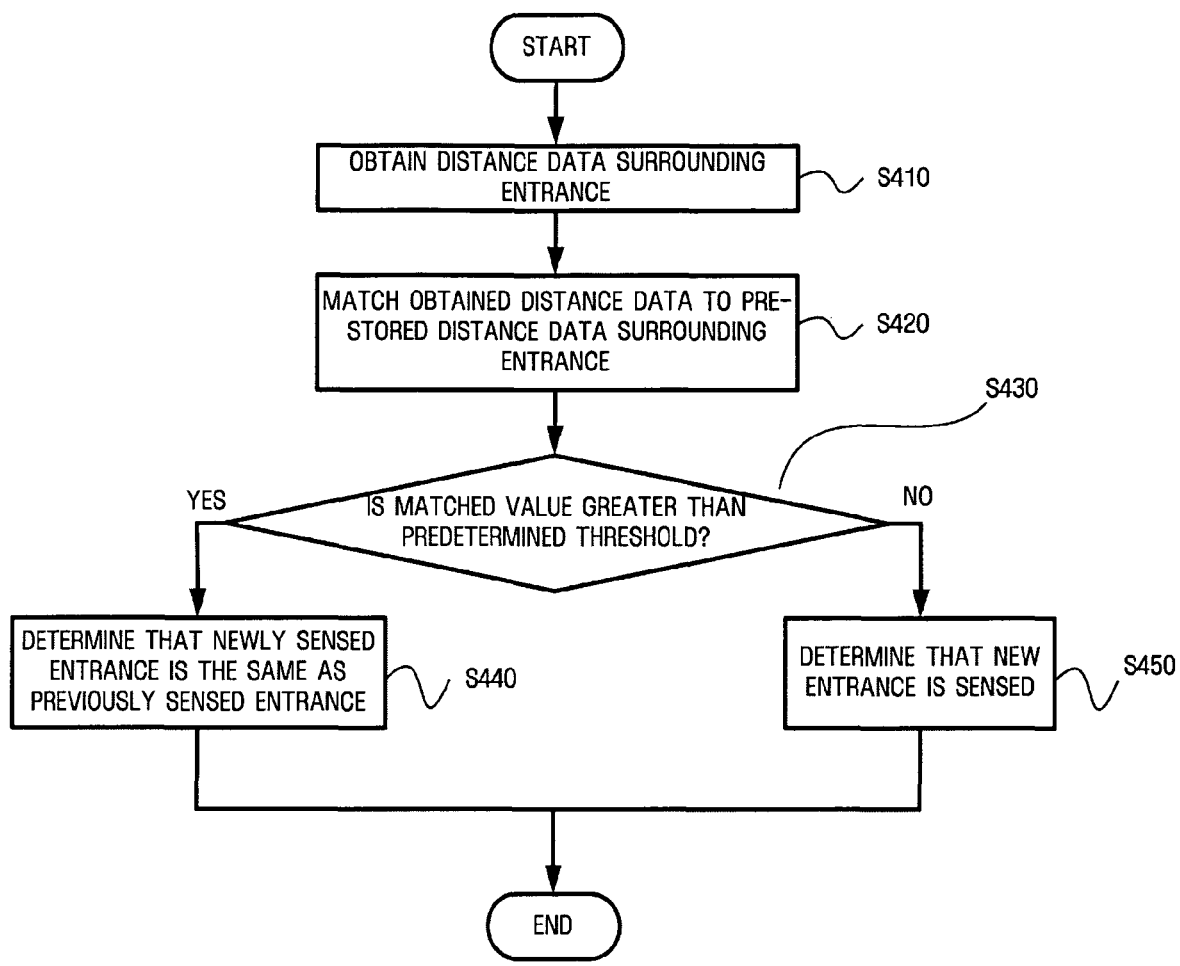
FIG. 7 is a flowchart illustrating a method of determining whether an entrance sensed according to an embodiment of the present invention is the same as the previously sensed entrance.

FIG. 7 is a flowchart illustrating a method for determining whether an entrance sensed according to an embodiment of the present invention is the same as the previously sensed entrance.

In the case where multiple entrances exist within the entire area in which a moving robot travels, an entrance width is generally the same. For example, the door of each room in a general home is usually of the same dimension. Thus, the entrance width is not a determination factor of an entrance. Rather, the pose-correcting method according to an embodiment of the present invention proposes use of distance data surrounding an entrance in determining whether the sensed entrance is the same as the previously sensed entrance. In a general home, room sizes are different and distance data surrounding the entrance is different depending on furniture arrangement. Therefore, it is possible to determine whether the sensed entrance is the same as the previously sensed entrance through comparison of the distance data surrounding the entrance.

First, distance data surrounding the entrance is obtained using a distance-sensing sensor (S410). That is, after sensing the entrance, the distance data surrounding the entrance is obtained by changing a pose of the moving robot, for example, a heading angle.

Next, the distance data surrounding the entrance is matched to pre-stored distance data surrounding the entrance (S420). The expression "matching the distance data" denotes matching images representing distance data to each other such that portions considered as being the same area are made to coincide with each other. Here, the Lucas-Kanade algorithm, which is well known in the art, can be used as the matching method.

As the degree of similarity between two matched images is higher, the value of overlapping pixels due to alignment becomes higher. Conversely, as the two matched images are dissimilar, the overlapping pixel value is reduced. The value of the two matched images is compared with a predetermined threshold (S430). If the value of the two matched images is greater than the predetermined threshold, suggesting that the distance data of the two images corresponds to distance data surrounding the same entrance. Accordingly, the sensed entrance is sensed as the same entrance as the previously sensed entrance (S440). Conversely, if the value of the two matched images is smaller than the predetermined threshold, suggesting that the distance data of the two images corresponds to distance data surrounding different entrances, the sensed entrance is determined as an entrance different from the previously sensed entrance (S450). If the sensed entrance is determined as a new entrance, the distance data of the entrance and distance data surrounding the entrance may be stored as data for the new entrance.

In an embodiment of the present invention, in the case where multiple entrances exist, for previously-sensed entrances, distance data surrounding the entrances are pre-stored. If entrances are sensed while traveling, distance data surrounding the entrances are compared to determine whether the entrances are the same entrance. If it is determined that the entrances are not the same entrance, new entrances are determined and distance data surrounding the new entrances are additionally stored. For example, while traveling relative to entrance 1 and entrance 2, a moving robot senses entrance 1 and entrance 2 as entrances, and distance data surrounding the entrances are stored. In such a state, an entrance is sensed while traveling, and is compared with pre-stored distance data surrounding the entrance 1 and entrance 2. If it is determined that the sensed entrance is not the same as the entrance 1, the sensed entrance is further compared with distance data surrounding the entrance 2. If it is determined that the sensed entrance is not the same as the entrance 2, the sensed entrance is determined as a new entrance and distance data surrounding the same is stored as entrance 3. In such a manner, a new entrance can be added.

Referring to FIG. 3, in operation S240, a process of correcting a pose of a moving robot using two pieces of distance data for the same entrance will be described with reference to FIGS. 8 through 10.

Figure 8:
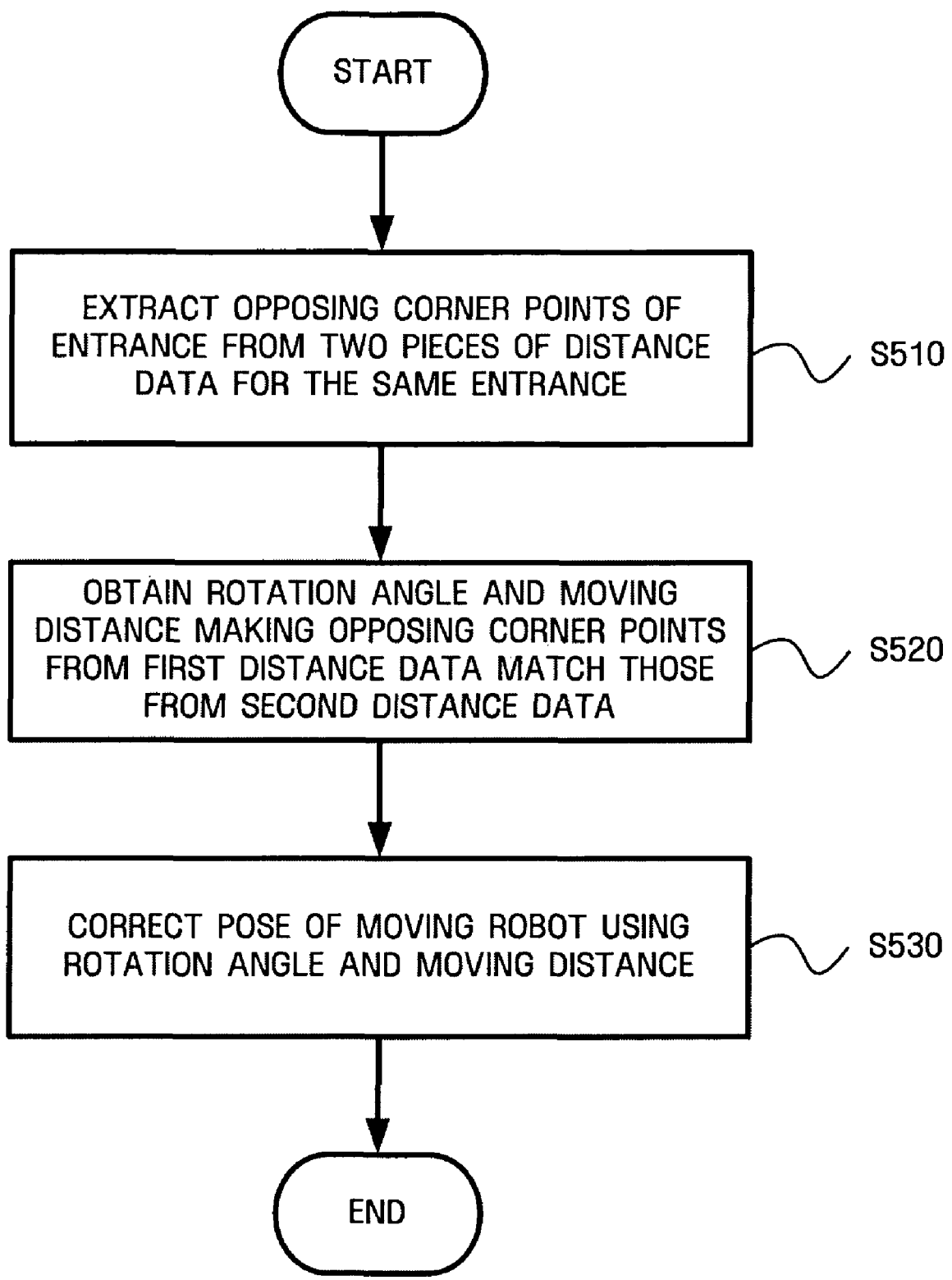
FIG. 8 is a flowchart illustrating a method of correcting a pose of a moving robot using distance data obtained from an entrance according to an embodiment of the present invention.
Figure 9:
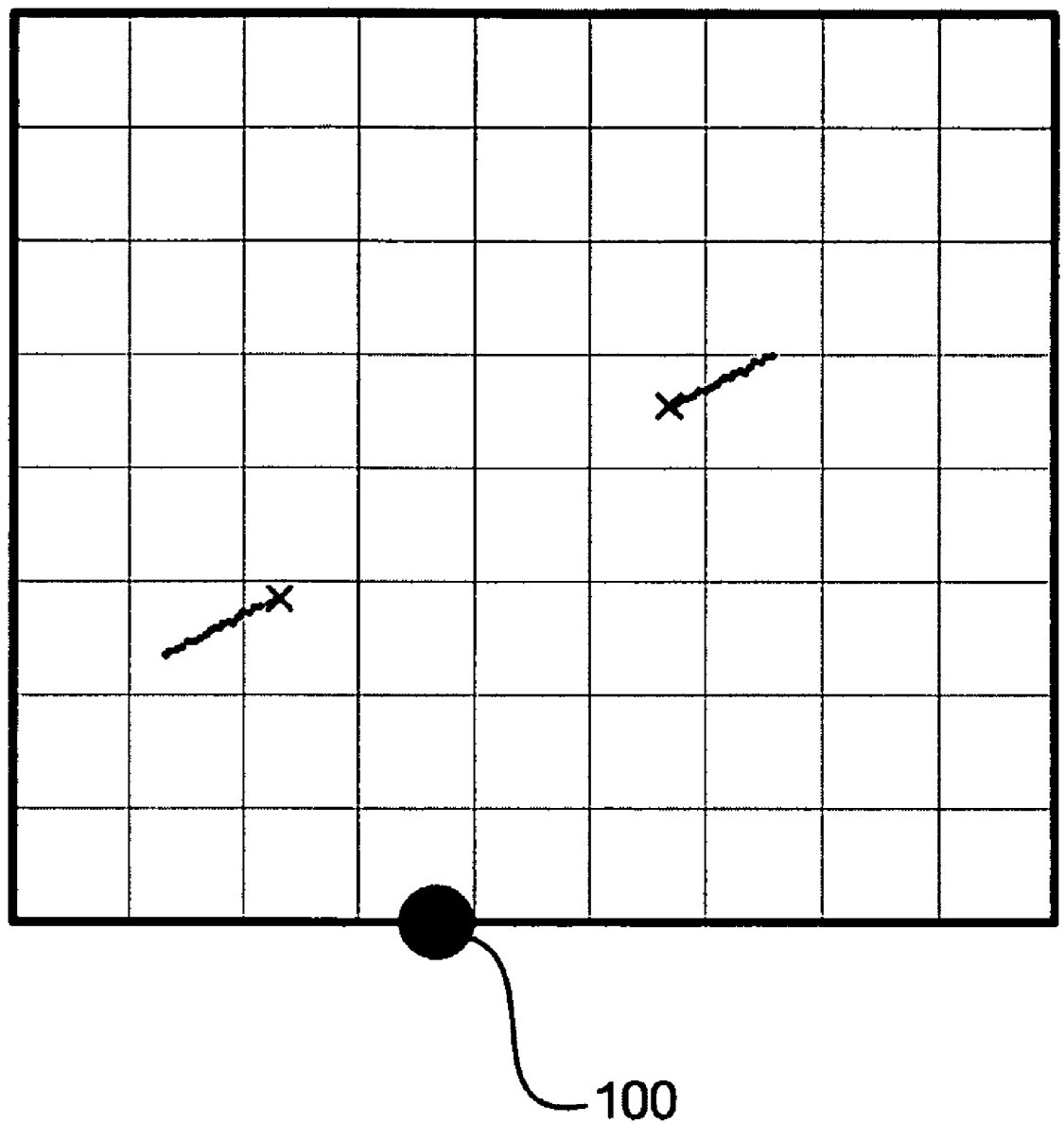
FIGS. 9 and 10 illustrate distance data of an entrance before and after entering the entrance.
Figure 10:
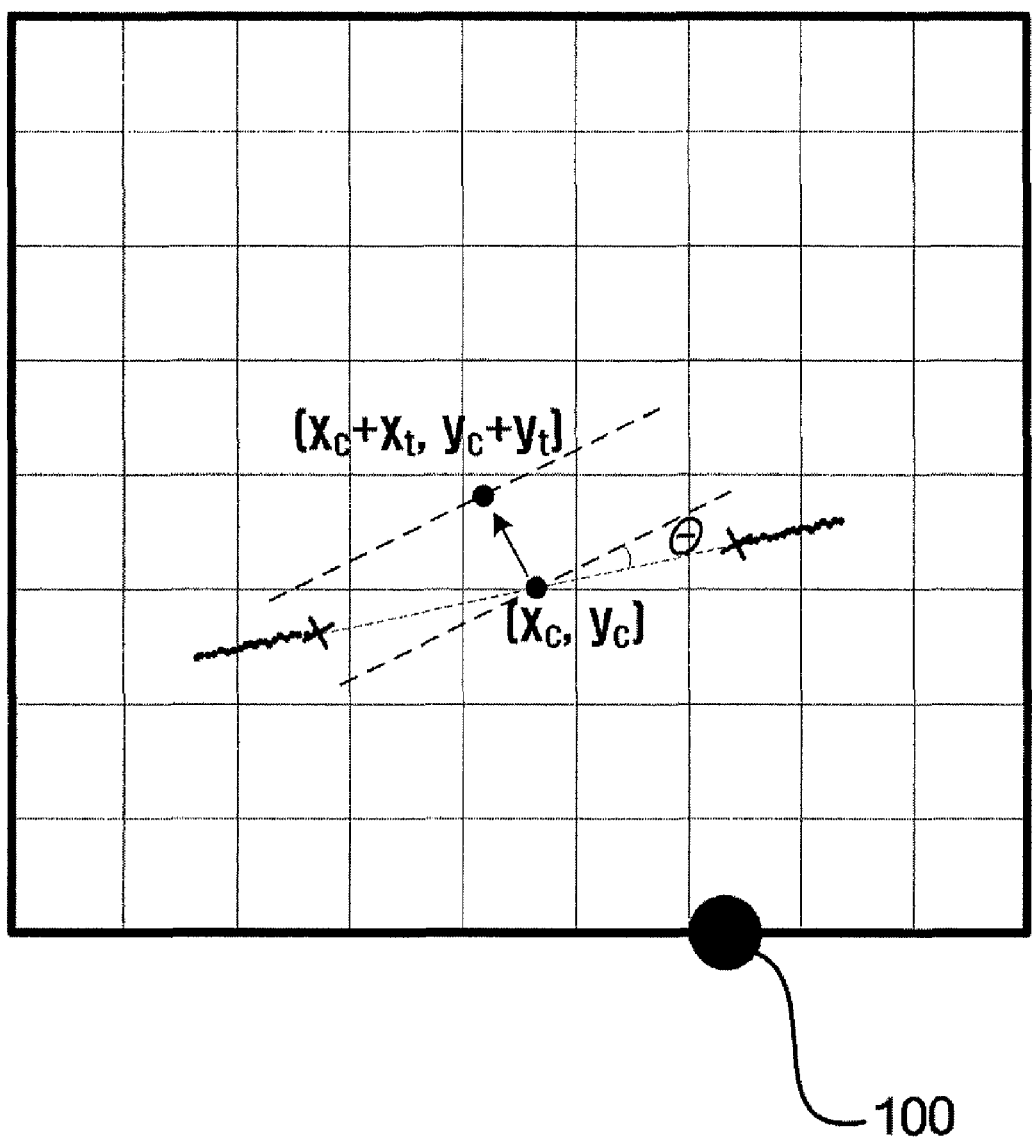

FIG. 8 is a flowchart illustrating a method for correcting a pose of a moving robot using distance data obtained from an entrance according to an embodiment of the present invention, and FIGS. 9 and 10 illustrate distance data of an entrance before and after entering the entrance.

First, opposing corner points of an entrance are extracted from first distance data and second distance data (S510). As described above, extraction of the corner points is performed by extracting a line from distance data and extracting corner points from the extracted line. In FIGS. 9 and 10, the corner points are denoted by reference symbol x.

Next, a rotation angle and a moving distance making the opposing corner points extracted from the first distance data match to the opposing corner points extracted from the second distance data are obtained (S520). As shown in FIGS. 9 and 10, positions of opposing corner points and orientations of lines connecting the opposing corner points are different, respectively. When the opposing corner points of the second distance data are rotated by Θ based on the center ($x_c$, $y_c$) of the opposing corner points in the second distance data and shifted by ($x_t$, $y_t$), the opposing corner points of the first distance data are made to match to those of the second distance data. By doing so, the rotation angle Θ and the moving distance ($x_t$, $y_t$) are obtained. While the foregoing description has been made with rotating the opposing corner points based on the center of the opposing corner points, if the rotation center for matching the opposing corner points varies, Θ is maintained at the same level but the moving distance ($x_t$, $y_t$) may be changed. That is, as the rotation center of the opposing corner points varies, the values of the rotation angle and the moving distance used to correct the pose of the moving robot may be changed in various manners.

Next, the pose of the moving robot is corrected using the obtained rotation angle and moving distance (S530). As described above, when opposing corner points are matched to each other by rotating the opposing corner points based on the center of the opposing corner points of the second distance data, the pose of the moving robot is corrected using equation (2):

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x - x_c \\ y - y_c \end{bmatrix} + \begin{bmatrix} x_t \\ y_t \end{bmatrix} \quad (2)$$

where (x, y) is a position of the moving robot when the second distance data is obtained and (x', y') is a corrected position of the moving robot.

A heading angle of the moving robot is obtained by adding rotation angle Θ to the heading angle of the moving robot when the second distance data is obtained.

In order to match opposing corner points extracted from the first distance data to those extracted from the second distance data, the rotation angle and the moving distance are obtained in the above-described manner, and the pose of the moving robot when the second distance data is obtained can be corrected. Thereafter, the SLAM procedure is performed based on the newly corrected pose. If an entrance is sensed during the SLAM procedure, the pose of the moving robot is corrected while repeatedly performing operations S210 through S240.

Figure 11:
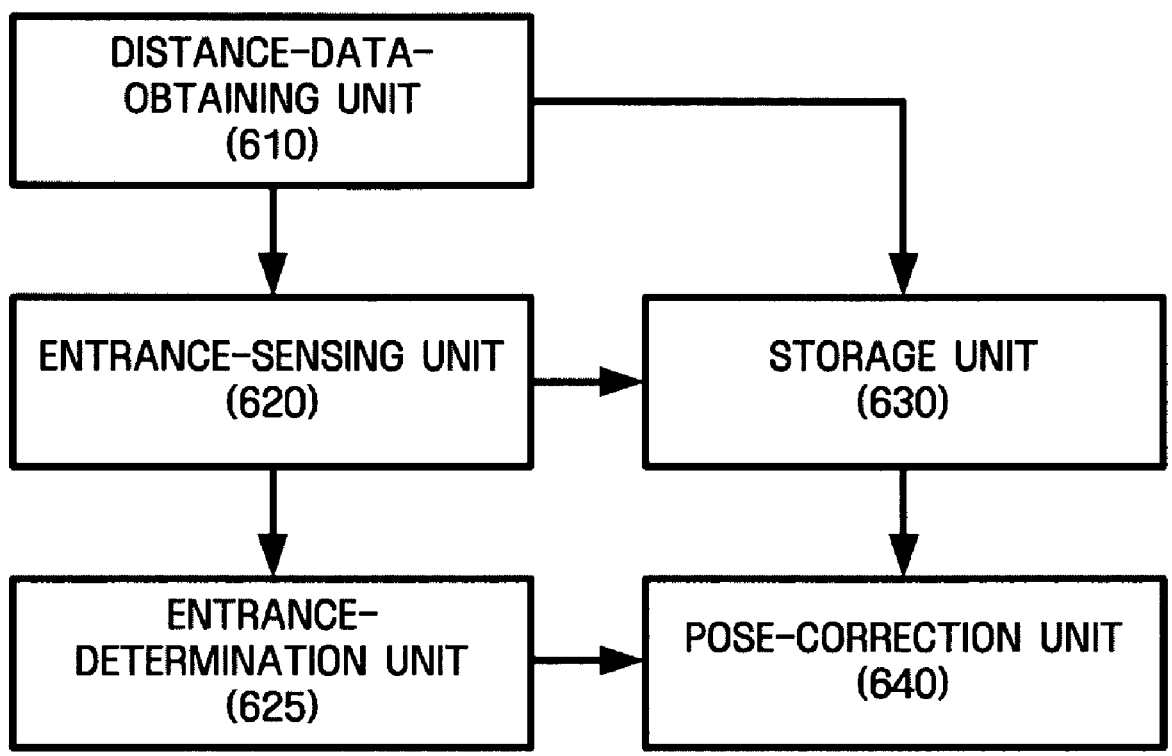
FIG. 11 is a block diagram of an apparatus for correcting a pose of a moving robot according to an embodiment of the present invention.

FIG. 11 is a block diagram of an apparatus for correcting a pose of a moving robot according to an embodiment of the present invention.

The pose-correcting apparatus includes a distance-data-obtaining unit 610, an entrance-sensing unit 620, a storage unit 630, and a pose-correction unit 640. The pose-correcting apparatus may further include an entrance-determination unit 625.

A "unit" used in the current embodiment can be implemented as a module. The term "module" as used herein, denotes, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The distance-data-obtaining unit 610 obtains distance data using a distance-sensing sensor mounted on a moving robot. Here, the distance-sensing sensor may be a structured light sensor, or an infrared sensor.

The entrance-sensing unit 620 senses an entrance from the distance data obtained by the distance-data-obtaining unit 610. The entrance-sensing unit 620 may further include a line-extraction unit (not shown), and a corner-point extraction unit (not shown). The line-extraction unit extracts a line from the distance data using the Hough transform algorithm. The corner-point extraction unit extracts opposing corner points of the entrance based on the extracted line. Here, the Harris corner detector algorithm, which is well known in the art, may be used. The entrance-sensing unit 620 compares a distance between the opposing corner points with a value being within a general range, the value commonly set for sensing an entrance.

The storage unit 630 stores the distance data of the sensed entrance. In addition, the storage unit 630 may store the distance data obtained during the SLAM procedure, or distance data surrounding the entrance in determining whether the sensed entrance is the same as the previously sensed entrance.

The pose-correction unit 640 compares distance data of the stored entrance and corrects the pose of the moving robot. In more detail, the pose-correction unit 640 corrects the pose of the moving robot using first distance data of the entrance first sensed and stored, and second distance data of the same entrance sensed again after the moving robot travels. This will now be described in greater detail. The opposing corner points of the sensed entrances are extracted from the first distance data and the second distance data, respectively. The rotation angle and moving distance making opposing corner points extracted from the first distance data match to the opposing corner points extracted from the second corner points are obtained, and the pose of the moving robot is corrected using the obtained rotation angle and moving distance.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code/instructions.

The computer readable code/instructions can be recorded/transferred on a medium in a variety of ways, with examples of the medium including computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), a CD-R (Recordable)/Rewritable, and DVD-R (Recordable/Rewritable). The media may also be a distributed network, so that the computer readable code/instructions is/are stored/transferred and executed in a distributed fashion. Still further, as only an example, the processing element could include a processor or a computer processor, and processing elements may be distributed and/or included in a single device.

For example, embodiments can be implemented in computing hardware (computing apparatus) and/or software, such as (in a non-limiting example) any computer that can store, retrieve, process and/or output data and/or communicate with other computers. Software includes computer readable code/instructions. The computer readable code/instructions may form a program. The results produced by the implementation of the software can be displayed on a display of the computing hardware. A program/software implementing embodiments may be recorded on computer-readable media comprising computer-readable recording media discussed above.

Further, according to an aspect of embodiments, any combination of the described features, functions and/or operations can be implemented.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of correcting a pose of a moving robot, comprising:
    sensing an entrance using a distance-sensing sensor mounted on the moving robot;
    storing first distance data of the sensed entrance;
    after the moving robot travels, newly sensing the entrance using the distance-sensing sensor to newly sense the entrance and to provide second distance data corresponding to the newly sensed entrance; and
    correcting pose of the moving robot using the first distance data and second distance data.

2. The pose-correcting method of claim 1, wherein the distance-measuring sensor is one of a structured light sensor, an infrared sensor, and an ultrasound sensor.

3. The pose-correcting method of claim 1, wherein the sensing of the entrance comprises:
    obtaining distance data from the distance-sensing sensor;
    extracting a line from the distance data;
    extracting corner points from the extracted line; and
    comparing a distance between the corner points with a value set for determining the entrance.

4. The pose-correcting method of claim 1, wherein newly sensing the entrance comprises determining whether the newly sensed entrance is the same as the previously sensed entrance.

5. The pose-correcting method of claim 4, wherein the determining whether the newly sensed entrance is the same as the previously sensed entrance, comprises:
    obtaining distance data surrounding the newly sensed entrance;
    matching the obtained distance data to pre-stored distance data surrounding the previously sensed entrance to determine a matched value; and
    if the matched value is greater than a predetermined threshold, determining that the newly sensed entrance and the previously sensed entrance are the same.

6. The pose-correcting method of claim 1, wherein the correcting of the pose of the moving robot comprises:
    extracting opposing corner points of the sensed entrance from the first distance data and the second distance data;
    obtaining a rotation angle and a moving distance which make opposing corner points extracted from the first distance data and opposing corner points extracted from the second corner points match up; and
    correcting the pose of the moving robot using the rotation angle and the moving distance.

7. The pose-correcting method of claim 1, wherein the pose is a position and a heading angle of the moving robot.

8. An apparatus for correcting a pose of a moving robot, comprising:
    a distance-data-obtaining unit to obtain first distance data using a distance-sensing sensor mounted on the moving robot;
    a storage unit to store distance data of the sensed entrance;
    the distance-sensing sensor to obtain second distance data using the distance-sensing sensor mount on the moving robot after the moving robot travels in order to newly sense the sensed entrance; and
    a pose-correction unit to compare the stored distance data of the sensed entrance and to correct the pose of the moving robot, wherein the pose-correction unit corrects the pose of the moving robot using first distance data corresponding to an entrance that is first sensed and stored and second distance data corresponding to the newly sensed entrance after the moving robot travels.

9. The pose-correcting apparatus of claim 8, wherein the distance-measuring sensor is one of a structured light sensor, an infrared sensor, and an ultrasound sensor.

10. The apparatus of claim 8, wherein the entrance-sensing unit comprises:
   a line-extraction unit to extract a line from the distance data; and
   a corner-point-extraction unit to extract corner points from the extracted line, wherein the distance between the corner points is compared with a value set to determine the entrance, and the entrance is sensed.

11. The apparatus of claim 8, further comprising an entrance-determination unit to determine whether the newly sensed entrance is the same as the previously sensed entrance, when the entrance is sensed after the moving robot travels.

12. The apparatus of claim 11, wherein the entrance-determination unit matches the distance data sensed newly, which is obtained by the distance-data-obtaining unit, to pre-stored distance data surrounding the previously sensed entrance in order to determine a matched value, and if the matched value is greater than a predetermined value, determines that the newly sensed entrance and the previously sensed entrance are the same.

13. The apparatus of claim 8, wherein the pose-correction unit extracts opposing corner points of the sensed entrance from the first distance data and the second distance data, obtains a rotation angle and a moving distance which makes opposing corner points extracted from the first distance data and opposing corner points extracted from the second corner points match up, and corrects the pose of the moving robot using the rotation angle and the moving distance.

14. The apparatus of claim 8, wherein the pose is a position and a heading angle of the moving robot.

* * * * *

UNITED STATES PATENT AND TRADEMARK OFFICE
CERTIFICATE OF CORRECTION

PATENT NO. : 8,165,717 B2  
APPLICATION NO. : 12/153600  
DATED : April 24, 2012  
INVENTOR(S) : Dong-jo Kim et al.

Page 1 of 1

It is certified that error appears in the above-identified patent and that said Letters Patent is hereby corrected as shown below:

Title Page Column 2 (Other Publications), Line 2, Delete "retrievied" and insert -- retrieved --, therefor.

Signed and Sealed this
Nineteenth Day of June, 2012

David J. Kappos
*Director of the United States Patent and Trademark Office*